358-86. OR 3,688,027 SR

United States Patent

Barrett

[15] 3,688,027

[45] Aug. 29, 1972

[54] SIGNAL BALANCE AND CONTROL SYSTEM

[72] Inventor: Robert G. Barrett, Columbia, S.C.

[73] Assignee: Cablecolor, Inc., Columbia, S.C.

[22] Filed: Sept. 15, 1970

[21] Appl. No.: 72,459

[52] U.S. Cl. ...........178/6.8, 178/DIG. 13, 333/28 R, 338/76, 340/216, 340/310, 340/416, 340/421

[51] Int. Cl. ...........................H04n 7/10, H04n 7/18

[58] Field of Search .......178/DIG. 13, 6.8; 333/28 R, 333/76

[56] References Cited

UNITED STATES PATENTS

| | | | |
|---|---|---|---|
| 3,535,640 | 10/1970 | Forrest, Jr. | 178/6 X |
| 2,682,037 | 6/1954 | Bobis et al. | 333/28 A |
| 3,562,417 | 2/1971 | Poppa | 333/28 X |
| 3,562,650 | 2/1971 | Gossard et al. | 178/DIG. 13 |
| 2,737,629 | 3/1956 | Beerbaum et al. | 333/28 R |

*Primary Examiner*—Robert L. Griffin
*Assistant Examiner*—Richard K. Eckert, Jr.
*Attorney*—Mason, Fenwick & Lawrence

[57] ABSTRACT

A pair of conductors carrying a plurality of television channel signals of different strength are connected by parallel branch circuits each having a coil and a capacitor extending in series between the conductors with the coil and capacitor of the first branch circuit having a resonance frequency analogous to the video side of a particular television channel and the coil and capacitor of the second branch circuit having a resonance frequency analogous to the frequency of the audio side of said particular television channel so that said particular television channel is dissipated to a voltage level substantially the same as the remaining channels; another feature of the invention resides in the mounting of one of the coil members in a circuit box mechanically connected to the lid of the box to be deformed upon opening of the box to destroy the circuit characteristics and provide a consequent indication of tampering with the box.

9 Claims, 7 Drawing Figures

T5003
RK

INVENTOR

ROBERT G. BARRETT

BY

Mason, Fenwick & Lawrence

ATTORNEYS

INVENTOR

ROBERT G. BARRETT

BY

Mason, Fenwick & Lawrence

ATTORNEYS

INVENTOR

ROBERT G. BARRETT

BY

Mason, Fenwick & Lawrence

ATTORNEYS

SIGNAL BALANCE AND CONTROL SYSTEM

This invention is in the field of electronic signal control systems and is specifically directed to a control system for providing a plurality of balanced TV channel signals along a coaxial cable or the like.

Many cable TV distribution systems of the type designed primarily for use in apartment buildings, mobile homes, sub-divisions, motels and the like are designed to provide clear channel reception for a plurality of channels delivered along a common signal carrying cable system. Unfortunately, the prior known systems have suffered from a number of defects inherent in the different strength levels of various TV channels received by the common antenna so that one or more channels will provide a much better reception than the other channels. This diversity of channel signal strength has been dealt with in the past by the expedient of amplifying all of the signals so that the weakest signals are of adequate level to provide a satisfactory picture. However, such amplification also amplifies the higher strength signals so that the percentage difference in strength between the signals remains the same following amplification. This has been an undesirable result in that a viewer switching between low strength and high strength stations is subjected to a volume variation along with picture variation so that the television set must consequently be readjusted in order to provide satisfactory results. Other television antenna systems have employed attenuating the strength of all of the channel signals to bring the higher strength signals down to a satisfactory level. This expedient is also obviously unsatisfactory since it always results in a reduction in the signal strength of the weaker channels along with the higher strength channels.

Moreover, differences in relative channel signal strength between various channels will progressively increase along the length of a coaxial cable extending from an antenna or other prime signal source and having a large number of television sets connected along its length. This gradual change in the signal strength of one or more channels with respect to the other channels progressively increases along the length outward from the prime signal source due to the cumulative effect of the different feed back characteristics for different channels in the various television sets along the cable. Consequently, it is possible for all of the channel signals coming from the prime signal source (normally an antenna or amplifier output) to be of substantially equal strength at a point closely adjacent the prime signal source but to be at a substantially different level with respect to each other at a point a considerable distance downstream from the prime signal means with a large number of television sets connected intermediate the downstream point and the prime signal source.

Another problem inherent in closed circuit TV antenna systems is that the circuit components which are mounted in circuit boxes and the like are frequently tampered with by the users for various reasons to the detriment of the owner of the system. Therefore, it is desirable that the circuit components be provided in a tamper-proof manner in which evidence of tampering will be immediately apparent in order that corrective steps can be taken.

The subject invention provides a uniquely efficient system for providing balanced channel signals along the entire length of a coaxial cable television antenna distribution system while also providing means for preventing or detecting unauthorized tampering with the circuit components.

These highly desirable results are enabled through the provision of a basic single channel attenuating circuit means connected between the conductors each having a capacitor and a coil in series with the coils of one branch having a self-capacity resulting in a low impedience to the audio signal and the other branch circuit having a low impedience to the video signal of the particular channel having the highest level so as to reduce the signal strength of that channel. The aforementioned coil and capacitor members are positioned in a circuit box in which the lid of the box is connected to a U-shaped bail extending under the coil so that removal of the cover of the box immediately distorts the physical dimensions of the coil to destroy its resonant frequency and impedience characteristics. Consequently, the coil will no longer dissipate the particular high level channels and the entire system will be rendered inoperable by virtue of any unauthorized tampering with the circuit box.

The aforementioned basic concept can be employed for reducing two channels to a desired lower level by mounting the channel dissipating circuits successively along the antenna for first dissipating the strength of one channel and then dissipating the strength of the other channel.

The full and complete nature of the subject invention will be better understood when the following detailed description is read in conjunction with the drawings in which.

Figure 1:
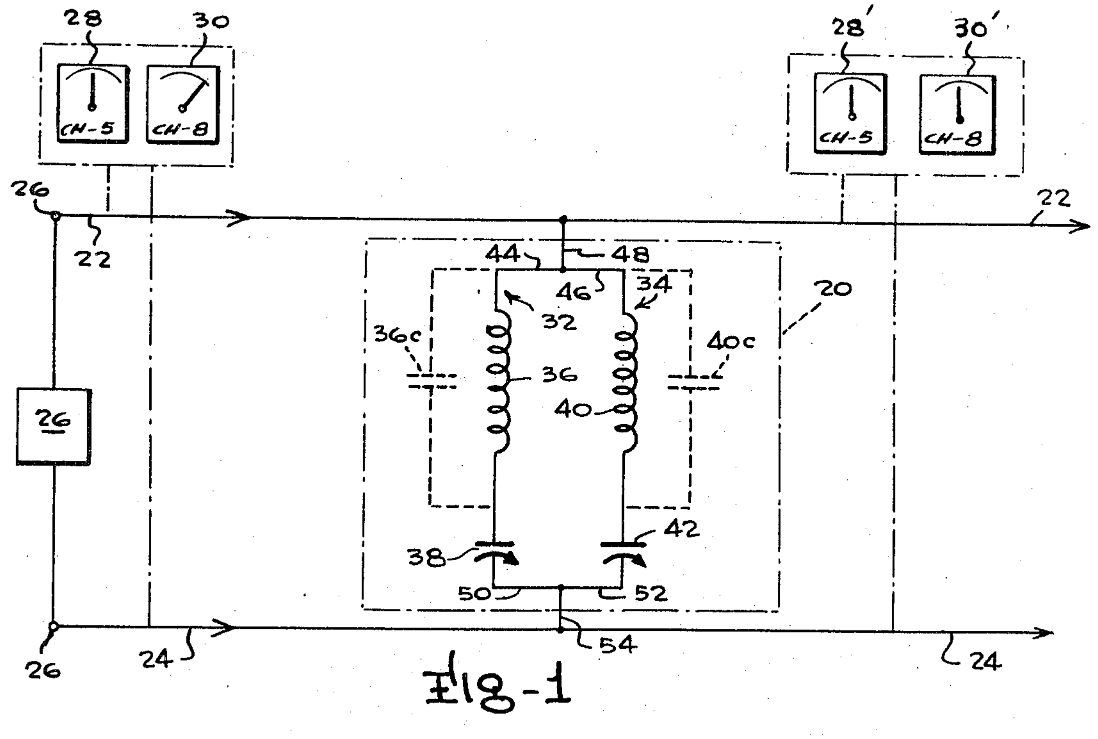
FIG. 1 is a schematic view of a preferred embodiment of a single channel attenuator means.

Attention is initially invited to FIG. 1 of the drawings which illustrates the basic circuitry component comprising a single channel attenuation circuit 20 shown in connection with a first signal carrying conductor 22 and a second signal carrying conductor 24 both of which are employed for carrying a plurality of television channel signals. Normally, the conductors 22 and 24 would comprise the inner core and the outer shield of a coaxial cable which would be extending from a prime signal source 26 such as an antenna or the output of an amplifier. Signal carrying conductors 22 and 24 are shown for purposes of illustration to be carrying channels 5 and 8 with the signal of channel 8 being at a substantially higher voltage level than the signal of channel 5 as schematically illustrated by the imaginary meters 28 and 30 respectively.

It should be understood that meters actually are not employed in the circuit and those illustrated in FIG. 1 and the other figures are merely for the purpose of illustrating the signal strength level at the circuit points to which the imaginary meters are shown to be connected. It will be noted that the voltage level of channel 8 from source 26 is considerably higher than that of channel 5 upstream from the audio channel attenuator circuit 20. However, the level of the voltages of the channel signals downstream of the single channel attenuator circuit 20 is substantially even as shown by the imaginary meters 28' and 30'.

The manner in which the single channel attenuator circuit 20, which is the basic "building block" component, lowers the level of channel 8 signal will now be discussed. The attenuator circuit comprises a first (or audio) branch circuit 32 and a second (or video) branch circuit 34 both of which are connected in a parallel with respect to each other. The first branch circuit 32 comprises an audio coil 36 and an audio capacitor 38 that is normally an adjustable capacitor.

Audio coil 36 has a self-capacity 36C which is illustrated in dashed lines and which cooperates with the other circuit components to provide a reduced impedience to the audio signal of channel 8 to consequently absorb a portion of the channel audio signal.

Similarly, video branch circuit 34 includes a video coil 40 which also has a self-capacity 40C which results in a lowered impedience for the video portion of the channel 8 signal. Video coil 40 is connected in series with a video capacitor 42 which is normally and preferably an adjustable capacitor but does not necessarily have to be adjustable. Similarly, it is not essential, although it is preferable, that the audio capacitor 38 be adjustable.

The parallel branch circuits 32 and 34 are connected respectively to the conductor 22 by means of conductors 44 and 46 respectively connected to a common conductor 48 which is in turn connected to the signal providing conductor 22. In like manner, the ends of the branch circuits 32 and 34 extending from the capacitors 38 and 42 are connected by conductors 50 and 52 respectively to a main branch conductor 54. It should be noted at this point that the conductor 46 can actually be dispensed with for channels above channel 13 in frequency. This is true because the intercoil capacitance of coil 40 is sufficient for coupling the two circuits.

Figure 2:
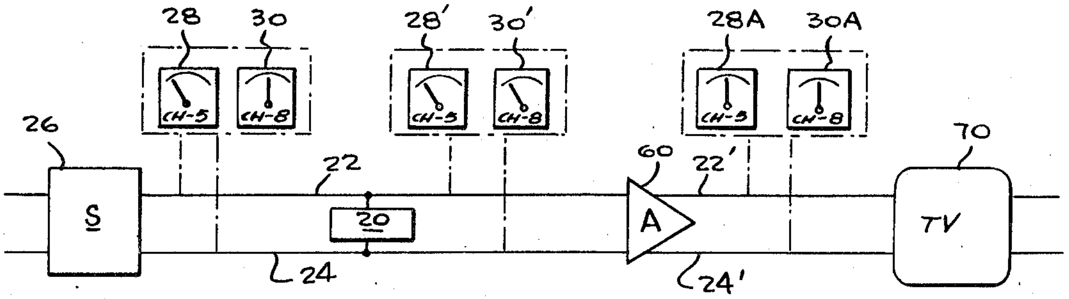
FIG. 2 is a schematic illustration of one manner of employment of the single channel attenuator.

The conductors 22 and 24 are connected downstream of the attenuator circuit 20 to television receivers, amplifier inputs or the like in accordance with the nature of the particular application. For example, FIG. 2 illustrates the manner in which unequal signals of channels 5 and 8 are made of substantially equal magnitude by reducing the strength of channel 8 as shown in imaginary meters 28, 28', 30 and 30'. However, the level of both channels in conductors 22 and 24 downstream of the single channel attenuating circuit 20 and is too low to provide adequate signal strength for a television set. Consequently, the conductors 22 and 24 are connected to the input of a subscriber outlet amplifier 60 which has output conductors 22' and 24' extending for connection to one or more television sets 70 (only one of which is illustrated).

It should be noted that the output in lines 22' and 24' of channels 5 and 8 has been increased so that the voltage level of both channels, while remaining substantially identical, is increased to a satisfactory level substantially above the level of input to the amplifier as shown by the imaginary meters 28A and 30A connected across lines 22' and 24'.

While the foregoing discussion has been directed to the situation in which only two channel signals are present on the main signal carrying conductors 22 and 24, the inventive system is also equally useful for balancing the signals of three or more channels as will now be discussed with initial reference being made to FIG. 3. Channels 5, 8 and 29 from signal source 26 are carried on the signal carrying conductors 22 and 24 extending to an amplifier which utilizes the signals in a manner to be discussed hereinafter. In this case, the output signals from the source 26 are such that the signal from channel 5 is at a substantially lower level than is the signal from channels 8 and 29 as shown by the imaginary meters 72. However, first and second single channel attenuator circuit members 20 and 20' are connected between the conductors 22 and 24 with the coils and capacitors of the single channel attenuator circuit 20 being adjusted to reduce the strength of channel 8 as shown in imaginary meter 73 and the coil and capacitors of the second single channel attenuator circuit 20' being selected to reduce the signal strength of channel 29 so that all three channels downstream of the attenuator circuit 20' are at substantially the same level as shown by imaginary meter 74. These balanced signals are fed into the input of a subscriber outlet amplifier 60 so that all three channels are raised to a satisfactory level as shown in imaginary meter 75. Output lines 22' and 24' from amplifier 60 are connected to one or more TV sets 70 lying along the output conductors 22' and 24'. It should be noted that if the output downstream of the second attenuator circuit 20' should be at a satisfactorily high level as would be measurable by the imaginary meter 74, amplifier 60 could be eliminated in most instances.

Figure 3:
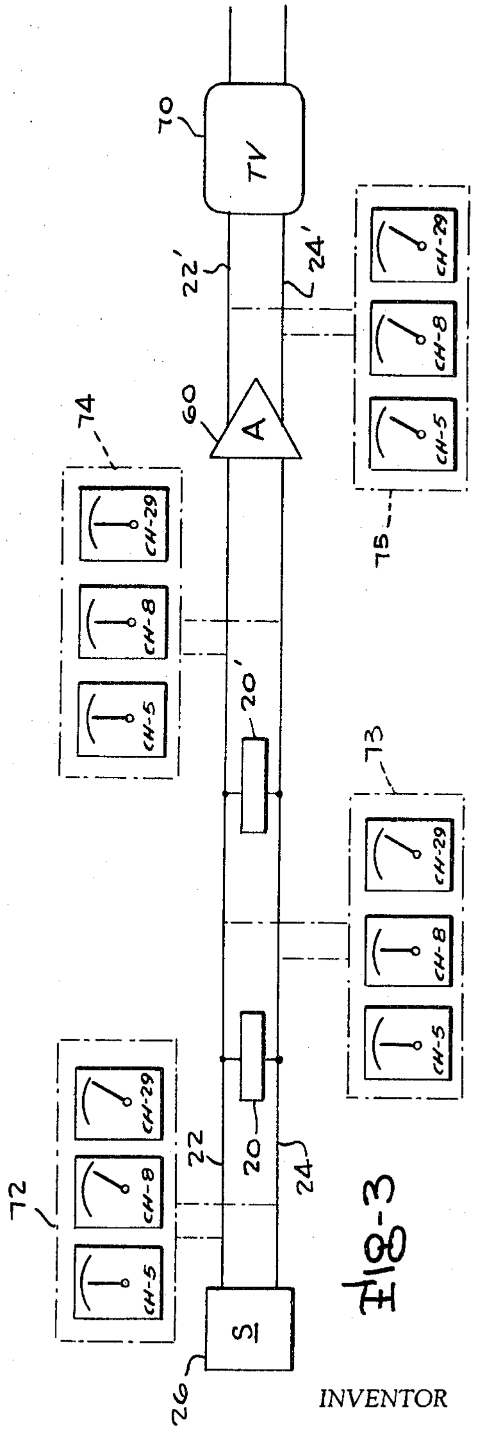
FIG. 3 is a schematic view illustrating another method of employment of the single channel attenuator means.

Moreover, the embodiment illustrated in FIG. 3 could be modified by the addition of one or more single channel attenuator circuits if the signal carrying conductors 22 and 24 should carry additional channel signals requiring attenuation.

Figure 4:
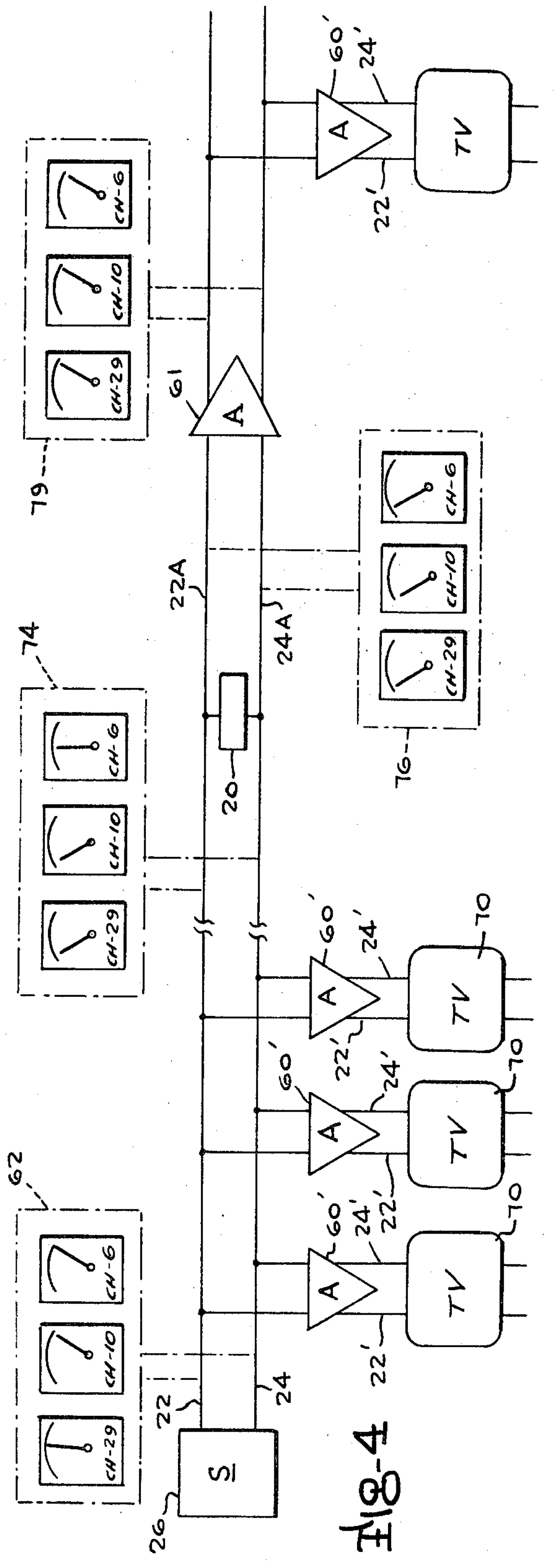
FIG. 4 is a schematic view of another method in which the single channel attenuator means is employed.

FIG. 4 illustrates another embodiment of the present invention in which a signal source 26, which could be either the output from a signal amplifier or from an antenna, provides a plurality of channel signals on conductors 22 and 24 of a trunk line with all of the channel signals being of substantially the same voltage level as shown by imaginary meters 62. The signals are fed to the inputs of a plurality of subscriber outlet amplifiers 60' having their input leads connected at different points along the length of the conductors 22, 24. The output of the various amplifiers 60' are connected to the antenna terminals of one or more television sets 70. Normally, no more than four television sets would be connected to the output of a single such amplifier.

However, the inductance and capacitance of the trunk conductors 22, 24 creates a cumulative buildup of impedance along the length of the conductors 22, 24 as one moves away from the signal source 26. Consequently, the impedance to one or more of the channels will be greater than it will be for others of the channels and the voltage level of such channels will consequently drop with respect to the other channels. This effect is shown by imaginary meters 74 spaced downstream on the conductors 22, 24 which illustrate the lowering of the signal strength of all of the channels but with the signal strength of channels 29 and 10 being lowered considerably more than the signal strength of channel 6. Therefore, in order to bring the strength of the channel signals up to a satisfactory level, a line amplifier 61 is connected to the trunk conductors 22, 24 to increase the channel signal strength as shown by imaginary meters 76. However, it should be noted that the relative strength of the channels would remain unchanged and channel 6 would remain at a much higher level than channels 29 and 10; consequently, a channel attenuator circuit 20 is interposed in the input line 22A, 24A from amplifier 61, and the channel 6 signal is thereby attenuated to a level substantially the same as channels 29 and 10 as shown by imaginary meters 79.

Subsequent subscriber outlet amplifiers 60' are provided along the signal providing lines 22A and 24A downstream of the amplifier 61. This arrangement completely isolates the trunk line conductors 22, 24, 22A and 24A from the television sets and consequently avoids any signal deterioration as would be occasioned by feedback from the television sets if they should be directly connected to the signal carrying conductors. Additional single channel attenuation circuits 20 could be employed in parallel connection between conductors 22A and 24A if it should be necessary to reduce the strength of more than one channel. The manner of such employment would be essentially identical to the manner illustrated in FIG. 3.

Figures 5, 6, 7:
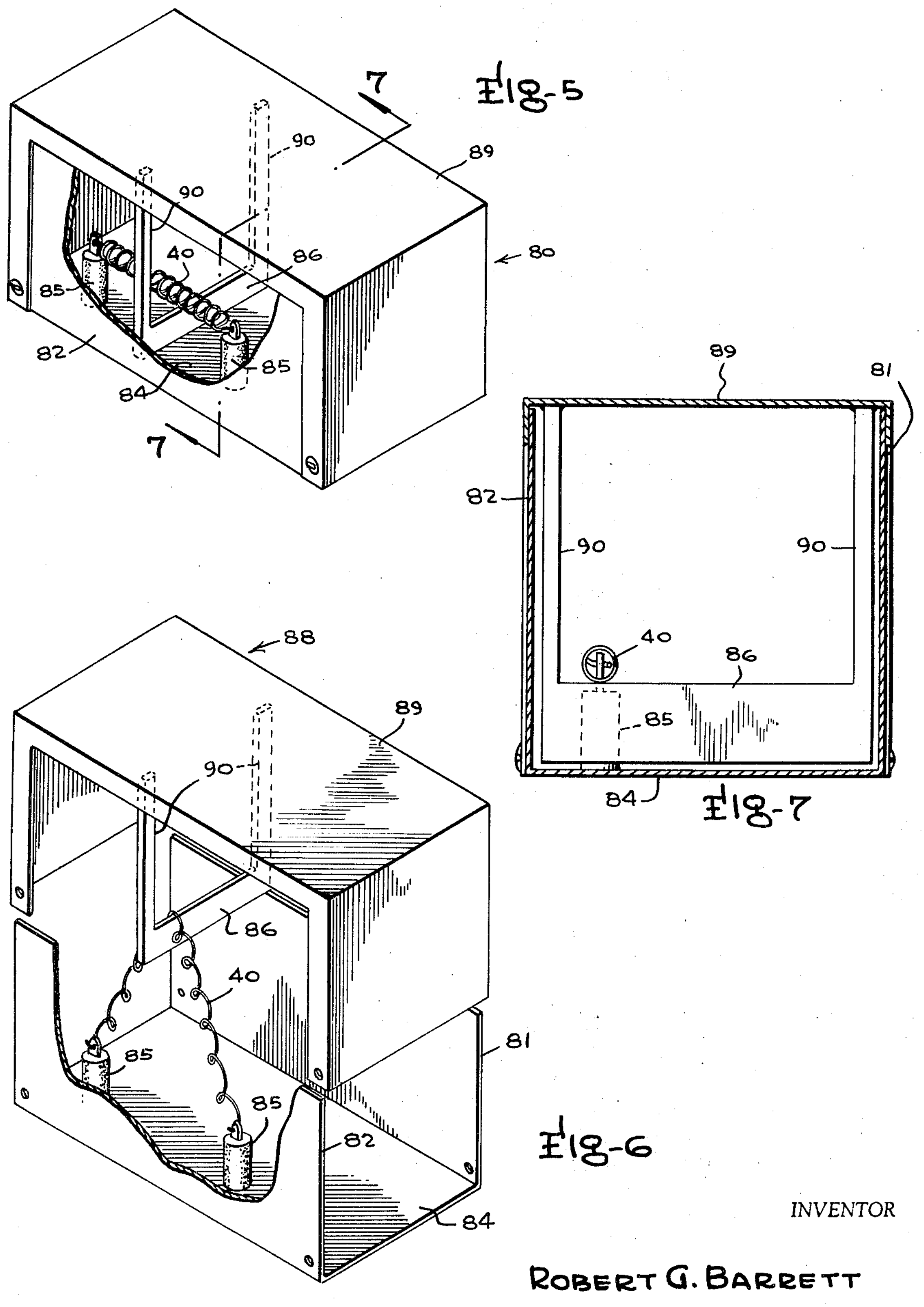
FIG. 5 is a perspective view with parts removed for clarity of a portion of the attenuator circuit as mounted in a circuit box.
FIG. 6 is a perspective view illustrating the parts in a position assumed following removal of the cover from the circuit box.
FIG. 7 is a sectional view taken along lines 7—7 of FIG. 5.

The single channel attenuator circuit members are mounted in circuit box members 80 each formed of a U-shaped base portion comprising vertical plates 81, 82 connected by a base plate 84 as best illustrated in FIG. 6. Base plate 84 provides support for terminals 85 between which either of the coil members 36 or 40 can be mounted as shown in FIG. 5. For purpose of illustration, the coil 40 is shown mounted on the terminals 85; however, coil 36 could also be mounted or both of the coils could be mounted in this manner. In any event, the coils supported by the terminals 85 extend between the terminals and a connector member comprising an elongated blade 86 extends between the base plate 84 and the coil as shown.

A cover plate in the form of a U-shaped cover member 88 is mountable over the base components and is normally retained in position by screws or the like as shown in FIG. 5. However, the connector means includes elongated arm members 90 extending upwardly from each end of the blade 86. The upper ends of arms 90 are connected to the upper plate 89 either by adhesive means or by virtue of a thermal softening or solidification process. When the upper ends of arms 90 are connected by the thermal process, the apparatus is positioned in the manner shown in FIG. 5 with the upper ends of arms 90 engaging the lower surface of cover plate 89. A heated member is then applied to the external surface of plate 89 and is sufficiently hot to soften the upper ends of the arms 90. The heated element is then removed so that upon cooling, the upper ends of arms 90 are secured to the inner surface of plate 89. Otherwise, conventional adhesive can be employed for securing the arms to the plate.

During installation of the components shown in FIG. 5, the coils 36 and 40, which are of single wire thickness, are manually manipulated by stretching or compressing to obtain the desired resonant frequency and impedance characteristics providing the reduced impedance to the particular video and audio signals of the channel desired to be attenuated. However, it will be obvious that removal of the cover plate 89 etc. will immediately mechanically distort, stretch and destroy the electrical characteristics of coil 40 as shown in FIG. 6. Consequently, the desired attenuation characteristics will be immediately and completely destroyed so that the circuit will be inoperable for its intended purpose.

It has been found that the individual channel attenuator circuits 20 can provide as much as 20 db attenuation on the particular channel being attenuated. The amount of attenuation is adjustable by means of the variable capacitors 38, 42. the range of attenuation is thusly adjustable between 0.1db up to 20db. The insertion loss of the individual channels which are not to be attenuated does not exceed 0.1db.

The subject invention can also be employed for various other installations in which plural channels are provided along signal carrying conductors. Therefore, it should be understood that the subject invention is not limited to television signals and could be used for other similar signals. Moreover, the invention is not limited to the exact embodiments illustrated since many obvious variations will occur to those skilled in the art. For these reasons, it should be understood that the subject invention should be limited solely in light of the appended claims.

I claim:

1. A television signal control system comprising first and second channel signal input conductors extending between a signal source and a signal receiving utilization means and carrying a plurality of television channel signals, a first channel signal being of higher voltage than a second channel signal, attenuation circuit means including a video branch circuit and an audio branch circuit connected in parallel between said first and second signal input conductors at a location spaced between said signal source and said signal receiving utilization means and having a low impedance solely for said first channel signal of higher voltage and a high impedance to the second channel signal whereby a portion of said first channel signal of higher voltage is dissipated in said attenuation circuit means and so that the signal strengths of said first and second channel signals at said utilization station are substantially equal wherein said branch circuit includes an audio coil connected in series with an adjustable audio capacitor with said audio coil having a self-capacity of a value so that it cooperates with said audio capacitor to result in a low impedance to the audio signals of the channel being dissipated and said video branch circuit includes a video coil connected in series with an adjustable video capacitor and a box-like enclosure enclosing said attenuation circuit means, said box-like enclosure having a removable access cover and including connector means connecting said removable access cover to one of said coils whereby removal of said access cover will physically distort the coil to which said cover is connected to change the resonant frequency of said coil and consequently terminate the dissipation of the higher voltage channel.

2. The invention of claim 1 wherein said box-like enclosure includes a base plate on which said one of said coils is mounted and said connector means includes a blade portion normally mounted between said base plate and said one of said coils and engaging adjacent turns of the coil and elongated arm members extending upwardly from said blade means on each side of said coil member and abutting adjacent said removable access cover.

3. The invention of claim 2 wherein said elongated members and said blade are of unitary plastic construction and said elongated members are connected to said removable access cover by initially positioning said removable access cover in abutting relationship to the ends of said elongated members with the access cover being in closed position and subsequently applying heat to the exterior surface of said access cover to melt the ends of the elongated members whereby upon removal of the heat the ends of said elongated members solidify and are fixedly secured to said removable access cover.

4. The invention of claim 2 wherein the ends of said elongated members abut against said removable access cover and are secured thereto by adhesive means.

5. A television signal control system comprising first and second channel signal input conductors extending between a signal source and a signal receiving utilization means and carrying a plurality of television channel signals, a first channel signal being of higher voltage than a second channel signal, attenuation circuit means extending between said first and second signal input conductors at a location spaced between said signal source and said signal receiving utilization means and having a low impedance solely for said first channel signal of higher voltage and a higher impedance to said second channel signal whereby a portion of said first channel signal of higher voltage is dissipated in said attenuation circuit means so that the signal strengths of said first and second channel signals at said utilization station are substantially equal, said attenuation circuit including an audio coil and a video coil enclosed in a box-like enclosure, said box-like enclosure having a removable access cover and including connector means connecting said removable access cover to one of said coils whereby removal of said access cover will physically distort the coil to which said cover is connected to change the electrical characteristics of the distorted coil to consequently terminate the dissipation of the high voltage channel.

6. The invention of claim 5 wherein said box-like enclosure includes a base portion on which said coil connected to said connector means is mounted and said connector means includes a blade portion normally mounted between said base plate and said coil connected to said connector means.

7. The invention of claim 6 wherein said elongated members and said blade are of unitary plastic construction and said elongated members are connected to said removable access cover by initially positioning said removable access cover in abutting relationship to the ends of said elongated members with the access cover being in closed position and subsequently applying heat to the exterior surface of said access cover to melt the ends of the elongated members whereby upon removal of the heat the ends of said elongated members solidify and are fixedly secured to said removable access cover.

8. The invention of claim 5 wherein the ends of said elongated members abut against said removable access cover and are secured thereto by adhesive means.

9. A television signal control system comprising first and second channel signal input conductors extending between a signal source and a signal receiving utilization means and carrying a plurality of television channel signals, a first channel signal being of higher voltage than a second channel signal, attenuation circuit means extending between said first and second input conductors including a video branch circuit having a video coil connected in series with a video capacitor and a box-like enclosure enclosing said video coil, said box-like enclosure having a removable access cover connected to said video coil whereby removal of said access cover will physically distort said video coil to change the electrical characteristics of said video coil and consequently terminate dissipation of the higher voltage channel.

* * * * *